United States Patent Office 3,830,888
Patented Aug. 20, 1974

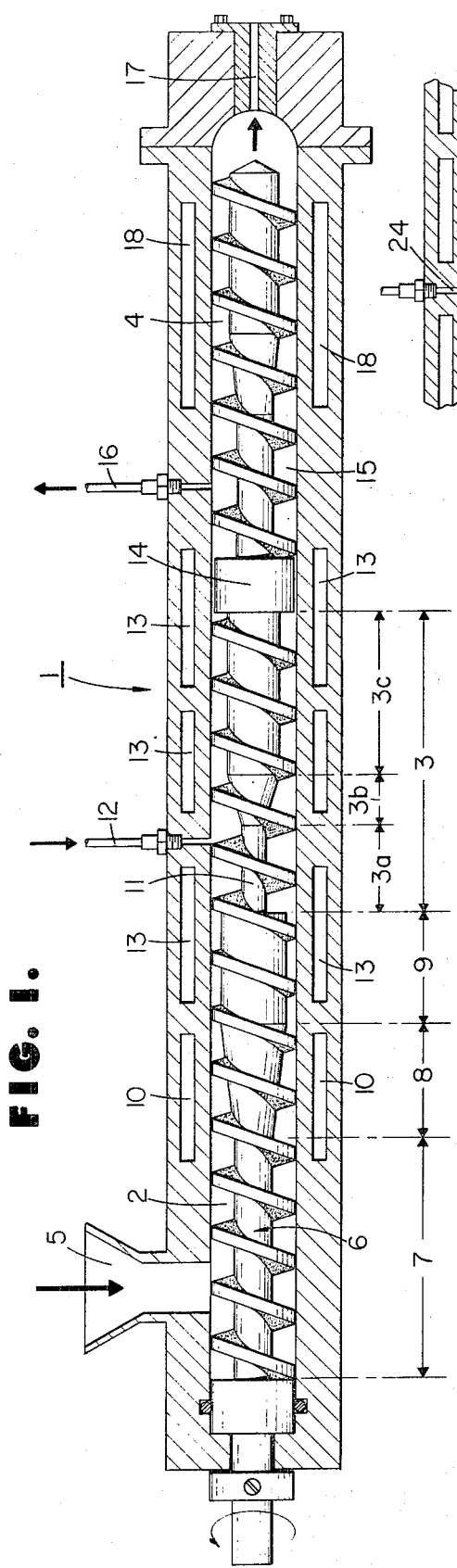
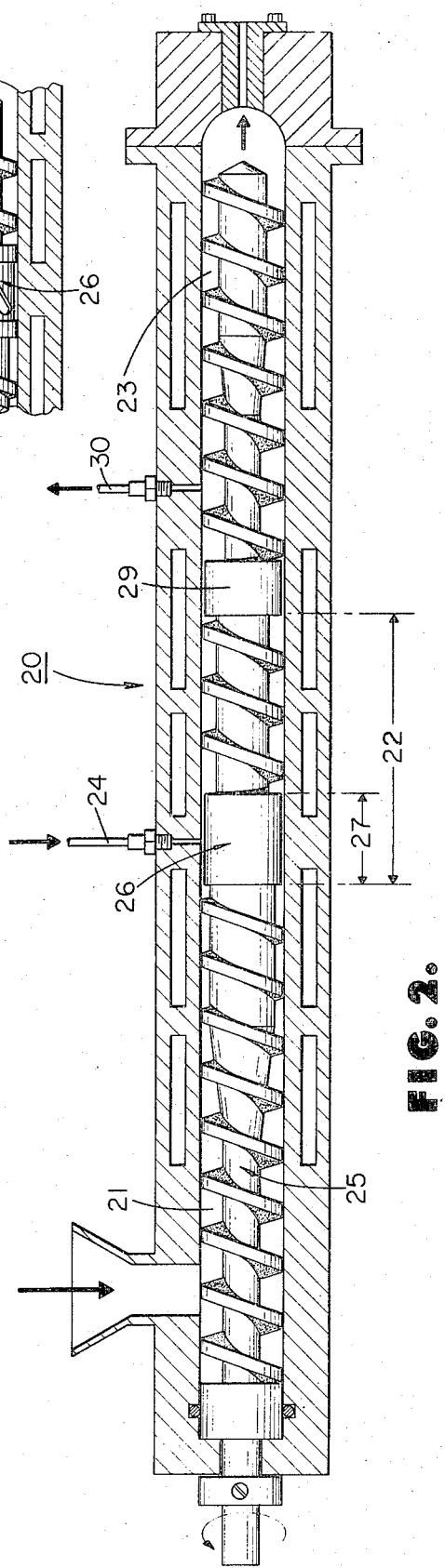

3,830,888
COMPOSITIONS COMPRISING A BLEND OF A VINYL RESIN AND GRAFTED OLEFIN POLYMER
Laurence F. King, Mooretown, Ontario, Canada, assignor to Esso Research and Engineering Company
Filed Apr. 3, 1972, Ser. No. 240,496
Int. Cl. C08f 29/24
U.S. Cl. 260—876                    8 Claims

ABSTRACT OF THE DISCLOSURE

Novel polyvinyl chloride compositions having improved processability plus good thermal properties and exhibiting no heat distortion aspects are obtained by blending a minor proportion of a particular grafted polyolefin into the PVC composition.

BACKGROUND OF THE INVENTION

Lubrication is one of the most important aspects of rigid PVC processing, whether it be extrusion and blow molding of bottles, extrusion of pipe, calendering of film or extrusion of profiles and siding. Lubricants are generally classified as being external or internal. A primary characteristic of an external lubricant is its low compatibility with the polymer, a feature allowing its retention on the surface of the resin melt, thus reducing the friction between the polymer and its process equipment.

An internal lubricant, on the other hand, tends to reduce intermolecular friction within the polymeric mass and is expected to have a certain affinity with the polymer. This affinity normally is obtained by introducing polar groups into the molecular structure of the lubricant, thus reducing the cohesive forces contributing to the rigidity of the polymer.

In polyvinyl chloride, for instance, the rigidity is mainly governed by restriction of bond rotation, and it is generally necessary to reduce stiffness during processing and to increase product flexibility.

Long chain hydrocarbons, amides, montan ester waxes and fatty acid esters as well as a number of metal carboxylates have been used as lubricants.

These materials of the art are intended to improve the processability of rigid PVC by any one or more of the following mechanisms:

(a) Reduce the friction between the molten plastic and the processing equipment.
(b) Lower the glass transition temperature (Tg) of the polymer.
(c) Increase the fusion rate of the polymer.
(d) Lower the melt viscosity.

British 1,204,655 is relevant prior art since it teaches the use of low molecular weight grafted materials as PVC lubricants. But the grafted materials of the invention are quite different in rheology and effect on vinyl plastic compositions.

RELATED APPLICATIONS

This application discloses subject matter from SN 94,832 filed Dec. 3, 1970.

SUMMARY OF THE INVENTION

An acid grafted polypropylene or other polyolefin of certain characteristics when incorporated in minor amounts of about 0.05 to 20 weight percent in vinyl polymers, particularly PVC, greatly improves the lubricant processing properties of the polymer and does so without adversely affecting its thermal stability and without depressing its heat distortion temperatures. The latter are normally undesired concomitants of using conventional lubricant additives.

DETAILED DESCRIPTION OF THE INVENTION

It has now been discovered and forms the conceptual basis of this invention that certain grafted polymers can be used as polyvinyl chloride lubricant additives. These polymers are particularly polyolefins, especially $C_2$ and $C_3$ polyolefins such as polypropylene which are grafted with relatively small amounts of carboxylic acids, preferably monocarboxylic acids, and most preferably acrylic acids and their derivatives. The comonomer component is present in amounts of from .001 to 3 weight percent based on the total weight of the final polymer blend. When so employed, these graft copolymers impart considerably enhanced processability to polyvinyl, particularly PVC, compositions without adversely affecting important heat stability properties and do not depress heat distortion temperatures.

Although the grafted polymer which can be utilized for the purpose of the invention will be more fully described in its broadest scope later herein, for the purposes of illustration the preferred embodiment which is a 6 weight percent acrylic acid graft to polypropylene will be used. It is referred to in short, for purposes of convenience, as PPAA.

Thus, PPAA in minor amounts possesses the unique characteristic of imparting to resulting PVC compositions both excellent lubricating properties and high thermal stability without depressing the heat distortion temperatures of the plastic compositons. Most other lubricants will degrade the heat stability of PVC to some extent when measured by its yellowing tendency.

Color concentrates or masking agents (blue toners) are almost invariably used to mask yellowing in the prior art resin compositions. However, incorporation of these toners decreases clarity and often degrades the thermal stability of the resin. Hence, it is most desirable to minimize the amount of toner added. By using the compositions of the instant invention, it is possible to greatly reduce or completely eliminate the amount of blue toner previously required while, at the same time, obtaining a thermally stable, easily processed product.

Furthermore, it is noticed that the glass transition temperature, i.e. Tg, is not lowered when using PPAA. Indeed the PPAA increased the glass transition temperatures somewhat. This is a significant advantage when products are molded from rigid PVC since the Tg corresponds closely to the heat deflection temperature of a plastic compound and desirably this should not be lowered.

Normally in compounded PVC it is necessary to use both external and internal types of lubricants, the amount of each being picked depending on the actual formulation requirements.

Normally microcrystalline waxes and polyethylenes are known as external lubricants. However, it has been found and forms a facet of this invention that polypropylene and PPAA behave as internal lubricants as well as external lubricants. Thus, since PPAA can be added as an external lubricant and will also act as an internal lubricant, it has substantial advantages since it will reduce the quantity of extrinsic internal lubricant that would normally be required.

Furthermore, the grafted additive of the invention not only imparts internal and external lubricating properties to a PVC composition but at the same time it prevents lowering of the Tg. It is remarkable and unusual that three beneficial results are obtained from a single additive.

Details on suitable grafts to be used with polyvinyl polymers are as follows. In the compositions of the invention it is possible to employ graft polymers prepared by known methods in the art, e.g. those to be found in U.S. Pats. 3,117,269; 3,177,270; 3,270,090; British 1,217,231; British 679,562 and the like.

The preferred modifying monomers which are grafted to the backbone are $C_3$ to $C_{10}$, preferably $C_3$ to $C_6$ unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, cyano acrylate, hydroxy methacrylate, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, and methacrylonitrile, sodium acrylate, calcium acrylate, magnesium acrylate and the like.

Other monomers which can be used either by themselves or in combination with one or more of the carboxylic acids or derivatives thereof include $C_8$ to $C_{50}$ vinyl monomers such as monovinyl aromatic compounds, i.e. styrene, chlorostyrenes, bromostyrenes, $\alpha$-methyl styrene and the like.

Other monomers which can be used are $C_8$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

Nevertheless the most outstanding results and the highly preferred embodiments of this invention are those in which the graft copolymer meets some highly specific criteria. Primary is the concept that the graft copolymer not only contain grafted active functionality but that the backbone polymer itself be reduced considerably in melt flow so that it is more compatible with other components of the total composition and also exerts a much more powerful synergistic influence on the overall composition.

CHARACTERISTICS OF THE PREFERRED GRAFTED POLYMER TO BE USED AS AN ADDITIVE

The preferred graft polymer to be used in the blends of the invention can be characterized in several respects. These are:

(1) A melt index or MFR of from 1 to 1,000 preferably 10 to 250, most preferably 20 to 100 and most preferably at least 25%, better 50%, and best 200% higher then the melt index of from no-flow to 50 as measured under conditions of ASTM test No. D–1238–65T.

(2) A graft comonomer content of from 0.1 to 20, preferably 1 to 15 and most preferably 0.2 to 10, based on the total weight of the graft copolymer.

(3) A die swell at least 0.05 preferably 0.1 of a unit less than that of the base polymer.

In an especially preferred embodiment, the lubricant additives of the present invention are prepared by grafting a polymer of a $C_2$ to $C_8$ mono-$\alpha$-olefin or its copolymers with acrylic acid in a special process. The polymers of $C_2$ to $C_8$ mono-$\alpha$-olefins are commonly referred to as polyolefins and for the purpose of this invention are to include copolymers of the $C_2$ to $C_8$ mono-$\alpha$-olefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology. The processes for making the $C_2$ to $C_8$ polyolefins are well known and form no part of the present invention.

Examples of suitable polyolefins, both plastic and elastomeric, include low or high density polyethylene, polypropylene, polybutene - 1, poly - 3 - methylbutene-1, poly-4-methylpentene-1, copolymers of monoolefins with other olefins (mono- or diolefins) or vinyl monomers such as ethylene-propylene copolymers or with one or more additional monomers, i.e. EPDM, ethylene/butylene copolymer, ethylene/vinyl acetate copolymer, ethylene/ethyl acrylate copolymer, propylene/4 - methylpenten - 1 copolymer and the like.

The term "copolymer" includes two or more monomer constitutents and substituted derivatives thereof.

The preferred polyolefins employed in the present invention contain propylene and/or ethylene, i.e. polypropylene and polyethylene. The starting polymer used as a base material in the present invention will preferably have a melt index (MI) of 1 to 40, preferably 5 to 40, and most preferably 15 to 40, or melt flow rate (MFR) between about 0.1 to 50 and preferably 0.1 to 5.0, most preferably 0.5 to 2. These melt flow rates correspond approximately to viscosity average molecular weights of about 500,000 to 2,000,000.

In the preparation of normally solid polymers of 1-olefins, certain rheological properties are frequently utilized for control purposes. One of these rheological properties more usually employed is melt index or melt flow rate which characterizes the processability of the polymers and is also an approximate indication of polymer molecular weight.

The melt index of polyethylene is measured normally according to the ASTM text D–1238–65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing in combinattion with its plunger 2160 grams.

The melt flow rate (MFR) of polypropylene is determined by the same procedure except at a temperature of 230° C. according to ASTM D–1238–65T.

The apparatus utilized for determining melt index is defined in ASTM manual as a "dead-weight piston plastometer."

Generally speaking, polypropylene from a reactor will have MFR below 1, while polyethylenes from a reactor can have a MI of about 15 to 30.

The preferred monomers to be grated to the $C_2$ to $C_8$ polyolefin and other polymers according to the present invention are maleic anhydride, acrylic acid, methacrylic acid, glycidyl acrylate, hydroxy methacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl benzoate, dicumyl peroxide, 2,5-dimethyl-2,5-di-*tert*-butylperoxy-3-hexyne (Lupersol 130, $\alpha,\alpha'$bis(*tert*-butylperoxy) diisopropyl benzene (VulCup R), or any free radical initiator having a 10-hour half-life temperature over 80° C. or mixtures thereof. Generally, the higher the decomposition temperature of the peroxygen compound, the better. See pp. 66–67 of *Modern Plastics,* November 1971, which is incorporated hereby by reference, for a more complete list of such compounds.

AN ILLUSTRATIVE EMBODIMENT FOR PREPARING THE GRAFTS TO BE USED

Referring to FIG. 1, an extruder 1, having a feed zone 2, a reaction zone or chamber 3, and a final metering zone 4 is utilized to carry out a preferred embodiment of the grafting process of the present invention.

In effect, polypropylene of a predominantly isotactic crystalline nature is introduced into a hopper 5 in the feed zone 2 of the extruder 1. The extruder screw 6 in feed zone 2 can be of various conventional designs such as a feed portion 7, a transition portion 8 and a first stage metering portion 9.

In feed zone 2, the polypropylene is heated by heaters 10 to a barrel temperature in the range of 400° to 650° F., preferably 400° to 550° F. It is one of the advantages of this invention that fairly low temperatures can be used to accomplish outstanding modification. In processes utilizing $O_2$ as an initiator, much higher barrel temperatures, i.e. about 600° to 800° F. are required and control is awkward. In processes utilizing heat alone, even higher temperatures and reaction times are necessary.

Extruder screw 6 has a root (sometimes called core) starting at the initial boundary of reaction zone 3 with a reduced cross-sectional area 11. This provides additional volume for reaction zone 3. When polymer under pressure reaches zone 3, the increased available volume results in a pressure drop, i.e., decompression, so that particular mass of polymer is not subjected to the ordinarily high pressures in the extruder.

An injection line 12 connects reaction zone 3 to a source of initiator, preferably a peroxide. In some instances the peroxide will be combined with an active monomer. For the purposes of this specific embodiment, the monomer is acrylic acid and the initiator is VulCup R.

Injection of initiator or initiator and monomer at this point, where low pressures in zone 3 prevail, provides thorough dispersion of the initiator in polypropylene over an extremely short period of time and appreciable scission or degradation of the polypropylene result. Appropriate controls of the polypropylene feed rate and screw speeds are maintained.

The process of the invention can be conveniently operated to give high throughputs with good quality. In this particularly preferred embodiment, the initiator and acrylic acid are added as a liquid blend to zone 3. When only degradation is desired, initiator alone or initiator dissolved in a solvent is introduced into zone 3.

It has been found that appreciable degradation of the polypropylene occurs when the back pressure against the liquid mixture of initiator and acrylic acid in injection line 12 is less than about 100 p.s.i.g., preferably about 0 p.s.i.g.

The pressure in injection line 12 therefore, provides one indication that the polypropylene feed rate and screw speed are being appropriately controlled for the particular products desired.

The resulting graft copolymers of the present invention have been appreciably degraded and changed in molecular weight distribution as compared to the base polymer. This is demonstrated by the fact that the graft copolymers of the invention have a lower die swell than the polypropylene base stock used in making the copolymer. Lower molecular weights are also indicated by changes in melt flow rates.

The portion of the extruder heated by heaters 13 will have a temperature of from about 160° to 450° F., preferably 250° to 350° F. The important thing is that the polymer be substantially in a melt phase during the reaction. The extruder screw 6 in the latter portion of reaction zone 3 can have any desired root cross-sectional area desirable to provide for pumping and ancillary mixing if desired and to allow residual reactants to complete their reaction.

It is to be noted that some homopolymerization of the acrylic acid (or any other monomer) to form polyacrylic acid also occurs. But this usually does not exceed 30% of the total acrylic polymer formed, particularly at the low monomer concentrations.

Preferably, the decompression portion 3a of the screw is immediately followed with transition zone 3b of gradually increasing screw root cross-sectional area followed by a metering zone 3c of constant cross-sectional screw root area.

Thereafter, extruder screw 6 has a melt seal (also called cap or blister) 14 which prevents the free escape of initiator and acrylic acid from reaction zone 3.

Screw 6 also has a second decomposition portion 15 following blister 14.

Vent line 16 (which can be optionally provided with vacuum, if desired) is positioned above decompression portion 15 to remove gases or vapors. When operating without vent line 16, blister 14 may be omitted.

The graft copolymer and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Referring now to FIG. 2, extruder 20, having a feed zone 21, a reaction zone 22 and a final metering zone 23, is also utilized to carry out the grafting process of the present invention. The process is generally similar to that described above for FIG. 1, except as follows. In one preferred embodiment, the initiator and acrylic acid are injected through injection port 24 at a point where the extruder screw 25 has a root 26 of very large cross-sectional diameter. The clearance between this portion of the root and the interior of extruder 20 is very small and will vary with extruder size. In the preferred 2 inch Egan extruder apparatus of the invention, this clearance is from 5 to 50, preferably 10 to 25, and most preferably 10 to 20 mils.

In another preferred embodiment shown in FIG. 3, the root of increased cross section or mixing device 26 is shown with a series of channels cut in the perimeter of the device. This results in a series of dead end channels. Under pressure, this forces the polymer out of the inlet channels and across the outer surface to the outlet channel. Other suitable devices could be used.

The novelty and unobviousness of the invention reside in the combination of such a mixing device with means to introduce reactants at a relatively early stage in the extrusion process.

In any event, whether the embodiment of FIG. 2 or FIG. 3 is used, the polymer outlet velocity is increased and forms a thin fluid film under relatively high shear as compared to the other portions of the extruder.

The initiator and/or acrylic acid are injected at pressures which range between 200 and 5,000 p.s.i. or more specifically, between 500 and 3,500 p.s.i. At these high pressures and because only a thin film of polypropylene is present at the high shear-thin film zone 27 of reaction zone 22, intensive, instantaneous mixing followed by appreciable degradation of the polymer, e.g. polypropylene, occurs.

Extruder 20 is also provided with a blister 29 and a vent 30. As in the case of the FIG. 1 extruder, both the vent and blister may be eliminated if desired.

As illustrated by the two embodiments of FIG. 1 and FIG. 2, various extruder designs may be employed to carry out the graft copolymerization process of the present invention. However, the common characteristic of each extruder design is that thorough, instantaneous mixing of the initiator and acrylic acid with the polymer, i.e. polypropylene, occurs. The extremely high degree of mixing which characterizes the process of the present invention is evidenced by appreciable degradation of the polymer. Evidence for the appreciable degradation of the polyolefin is shown by the substantial increase in the melt flow rate or melt index of the copolymer over the base resin. Evidence for a narrowing of the molecular weight distribution is seen from the fact that the die swell of the graft copolymer is lower than the die swell of the polyolefin base stock used in making the copolymer. It is to be emphasized that a change in molecular weight distribution leads to many useful and novel properties of the resulting polymers.

DIE SWELL

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some the ratio to the first power and by others to the second power). The term "die swell" as used herein is defined as follows:

$$\text{die swell} = \left(\frac{D_e}{D_o}\right)^2$$

where:

$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of 3/8" I.D. (inside diameter) was used wherein the barrel was heated to a temperature controlled to ±2° F. of the recorded temperature and the polymer was forced through a capillary having a 0.03018" I.D. and which was 1.006" long. The capillary had a 90° entry angle.

The measurements were made by forcing the polymer through the capillary by a plunger operating at a constant speed or a constant shear rate ($\gamma$) ranging from 13.5 reciprocal seconds to 338.3 reciprocal seconds (sec.$^{-1}$). The polymer was forced through the capillary into ambient air at room temperature (70°–80° F.).

The measurement of die swell is frequently used as a gross measure of molecular weight distribution in polyolefins; high die swell resins possess broader molecular weight distribution than polymers having lower die swells.

GENERAL REACTION CONDITIONS

The free radical initiator is used in amounts corresponding to 0.005 to 5, preferably 0.02 to 2, most preferably 0.02 to 1.0 weight percent based on polymer. When based on monomer, free radical initiator is used in amounts of 0.0001 to 1, preferably 0.001, and most preferably 0.001 to 0.5 weight percent.

The monomer to be graft polymerized is used in amounts of 0.01 to 100, preferably 0.05 to 50, and most preferably 0.1 to 25 weight percent of the base polymer.

Generally, the monomer and initiator are blended together and added simultaneously, except in the situation of a polyethylene or ethylene predominant copolymer.

Therefore, in the description of the invention as follows, from time to time certain differences in the applicable process conditions must be employed when the primary characteristics of the polymer are determined as a result of its ethylene content.

It is also to be noted that the process is applicable to elastomers of all classes which are capable of being handled by an extruder. Examples include natural rubber, polyisobutylene, butyl, chlorobutyl, polybutadiene, butadiene-styrene, ethylene-propylene, ethylene-propylene diene terpolymer elastomers and mixtures thereof with each other and with thermoplastic polymers. Blends of elastomers and plastics in any portions particularly benefit from being processed by the described process.

These grafted elastomer-containing blends will also impart impact properties to the resulting PVC blend.

Generally speaking, the preferred polyvinyl blends, particularly PVC, which have been improved by the addition of the described grafted polymer of the invention will contain from about 0.05 to 20, preferably 2 to 15, most preferably 2 to 10 weight percent of a grafted polymer having about 0.01 to 15, preferably 2 to 10, and most preferably 3 to 8 weight percent of grafted component.

The balance of the composition can contain any conventional components desired. These can be altered suitably to compensate for the presence of the graft polymer.

Blending can be done in any convenient manner, i.e. Banbury, extruders, hot rolls, mills, and the like.

Although the application thus far, for convenience purposes has been discussed in terms of PVC, it is to be understood that PVC is a specific member of a generic polyvinyl plastics class and includes such members as derivatives of PVC, e.g. chlorinated PVC, polyvinyl acetate, polyvinyl alcohol and polyvinyl butyral.

The term "polyvinyl chloride resin" as used in this invention is meant to include both homopolymers of polyvinyl chloride and co- and terpolymers of vinyl chloride with comonomers such as vinyl acetate, vinyl formate, alkyl vinyl ethers, ethylene, propylene, butylenes, vinylidene chloride, alkyl acrylates and methacrylates, alkyl maleates, alkyl fumarates, etc. Preferably, at least 80% and most preferably 100% of the monomers to be polymerized will be vinyl chloride monomer.

These resins preferably have a weight average molecular weight of about 40,000 to about 90,000, and preferably from about 55,000 to about 80,000. Inherent viscosity (as measured by ASTM D1243–60, Method A) will generally be in the range of about 0.5 to about 1.0, preferably in the range of about 0.6 to about 0.9. The method of preparation of these resins is not critical and any of the well-known suspension techniques may be employed.

This family of polyvinyl homopolymers and copolymers has probably the largest commercial utilization of any class of polymers.

This is primarily due to the fact that these materials particularly PVC can be compounded to produce a wide spectrum of physical properties. In this particular application the rigid PVC is the preferred physical embodiment. PVC can be used for extruding pipe, building products, bottles and other molded requirements such as siding for houses.

Rigid vinyls are hard, tough thermoplastics which can be compounded to achieve a wide range of structural properties and they also can be modified for processing by a multitude of selected techniques.

Such vinyls provide significant properties such as corrosion resistance, thermal and electrical insulation, flame resistance, weather resistance, and a wide range of opaque colors or even great clarity. Rigid vinyls are used for industrial pipes, duct systems, fume hoods, tanks, water supply and sanitary systems, all of which are subjected to a wide range of environmental exposures.

Lately, rigid PVC is finding use in building products, including house sidings, window sashes, building panels, gutters, downspouts, flashing, conduit and electrical raceways.

Injection-molded vinyl parts are produced using in-line screw-preplasticizing equipment. Products include automotive and appliance parts, electrical and pipe fittings, all of which are well known for their durability, attractive appearance and fidelity of surface reproduction.

Generally, compounded polymer is converted by melt processing, involving, first an extrusion step. In the high-viscosity, low-temperature system processing, low production rates are necessary, in order to maintain the dimensional accuracy of the product. Single screw extruders can process, cube or pellet compound at various levels of work. With the novel composition of the invention, lower melt viscosities can be utilized and still maintain dimensional accuracies.

PVC is also injection molded using high-shear screws which generate low-viscosity melts that flow quite freely into the furthermost parts or sections of the mold cavity. PVC is also customarily blow molded and calendered.

The invention is further illustrated by the following examples:

Example 1

This example is intended to
(1) demonstrate the use of grafted polypropylene as a lubricant
(2) show that it does not contribute to thermal degradation during processing as do conventional lubricants and
(3) does not tend to exude from the surface of a finished article if more than one or two percent is added.

Since polypropylene is not ordinarily compatible with PVC by blending, it was unexpected to find that the described grafted polypropylene was compatible and that it also increased the lubricating properties of the rigid PVC compounds.

In this example, various portions of acrylic acid (6 weight percent) grafted polypropylene made according to the above description having a MFR of 50 and a die swell of 1.50 at 13.5 sec.$^{-1}$ was added in various quantities to conventional rigid PVC.

The resulting compositions were tested on a 6-inch mill at 375° F. The evaluation determined the time in which it took the particular PVC compound to stick to the rolls and also determined the color of the compound as an indication of its stability. The results are summarized below in Table I.

TABLE I
Test On 6-inch mill at 375° F.

|  | Time to sticking to rolls, minutes | Color at— 25 min. | End point |
|---|---|---|---|
| Heat stable PVC bottle compound.[1] | 25 | Yellow |  |
| Parts of PVC replaced by PPAA:[2] |  |  |  |
| 2.5 | 50+ | Yellow | Dark brown. |
| 5 | 75+ | Pale yellow. | Do. |
| 10 | 90+ | do | Do. |

[1] Composition I of Example 3.
[2] 6% acrylic acid grafted on polypropylene prepared by the process described above.

As can be seen from the above Table I, the time of processing before sticking to rolls is observed, is drastically increased with only 2.5 parts of the polypropylene graft and increased almost 4 times with 10 parts of polypropylene graft.

Also as the amounts of grafted polypropylene used are increased, the color at 25 minutes is a pale yellow as opposed to a full yellow at 25 minutes with an extremely heat stable PVC bottle compound which in its own right is novel since it is one of the inventive species of S.N. 94,832 and has outstanding heat stability.

Furthermore, although the grafted polypropylene does reduce the clarity of the resulting formulation, it is still quite remarkable in terms of exudation, since even at a 10 percent concentration, which is extremely high by conventional lubricant standards, no exudation from the surface is noticeable. Thus the excellent heat stability of the high proportions of grafted polypropylene is accompanied by a lack of exudation, a quite remarkable phenomenon in view of conventional art.

Example 2

Compositions similar to those prepared in Example 1 above were tested in a UV accelerometer for photodegradability. With the mounting concern with environmental problems, there has been a concerted effort by many polymer synthesizers and processors to develop polymers which are photodegradable in order to make the recycle or disposal problem considerably easier as an ecological proposition.

The results of the grafted polypropylene on the photodegradability PVC formulation is shown below in Table II.

TABLE II
Photodegradability:
UV Accelerometer.
Time to Brittleness:
Hour.

| | |
|---|---|
| Heat stable PVC bottle compound | 100+ |
| Parts of PVC replaced by PPAA: | |
| 5 | 30 |
| 10 | 30 |

As can be seen from the above Table II, the photodegradability of the PVC containing the grafted polymer is greatly improved over PVC formulations having no grafted polymer. This could be a very desirable property if the present day ecological concerns become more intensified.

This data was not reproducible in later tests. Such tests showed that photodegradability was slightly improved over PVC per se. But in no event was photodegradability time increased by the use of the grafted polymer.

Example 3

In order to further demonstrate the heat stability of novel PVC formulations containing the grafted polypropylene, a series of compositions were formulated. These were tested in a dynamic mill stability test under prescribed conditions of temperature and time. This was followed by compression molding and evaluation of test specimens for clarity and yellowness index to demonstrate the specificity of the additive.

Two control experiments were run at the same time; one with 100 percent PVC, the other with 97.5 percent PVC and 2.5 percent polypropylene. (Polypropylene is generally considered to be incompatible with PVC by mechanical blending.) The formulations, Compositions I to V, and the resin properties are set forth in Table III and IV as follows.

TABLE III.—FORMULATIONS OF EXTRUSION-BLOW-MOLDING COMPOUNDS

| Composition | I | II | III | IV | V |
|---|---|---|---|---|---|
| PVC resin (K-value of 63) | 100 | 97.5 | 97.5 | 95 | 90 |
| Polypropylene resin |  | 2.5 |  |  |  |
| Polypropylene, 6% acrylic acid graft copolymer (PPAA) |  |  | 2.5 | 5 | 10 |
| Impact modifier, MBS type [1] |  |  | 12 |  |  |
| Thio-organotin stabilizer |  |  | 2 |  |  |
| Diisooctylphenyl phosphite chelator |  |  | 1.5 |  |  |
| Polymethylmethacrylate processing acid |  |  | 3 |  |  |
| Microcrystalline wax [2] |  |  | 1 |  |  |
| White oil [2] |  |  | 0.5 |  |  |
| Ultramarine violet toner |  |  | 0.025 |  |  |

[1] Methacrylate-butadiene-styrene terpolymer.
[2] White oils and microcrystalline waxes defined at the end of the examples.

TABLE IV.—PROPERTIES OF RESINS

| | PVC homopolymer | Enjay polypropylene general purpose extrusion grade CD-465 | PPAA |
|---|---|---|---|
| Inherent viscosity, ASTM D-1243-60, method A | 0.76 | | |
| Molecular weight (weight average) | 67,000 | | |
| Glass transition temperature, ° C | 78 | | |
| Melt flow rate at 230° C., g./10 min. (CPL method) | | 4.0 | 50 |

Clarity which is designated as $Y_{CIE}$ was determined by ASTM procedure D-1925-63T on samples taken at 5-minute intervals. Generally speaking, the marketable transparent PVC bottles will have a clarity value $Y_{CIE}$ of at least 71 and usually falling between 71 and 73. Whereas Compositions III, IV, and V containing PPAA had values falling in the 73-75 range whereas the Composition I and Composition II compounds with polypropylene and no additive respectively, fell in the 70-73 range.

Thus, this laboratory test indicates directionally that the inclusion of the grafted polypropylene additive of the invention in the novel PVC formulations of the invention seems to directionally increase the transparency of the composition.

When slightly different formulations were used (containing grafted polymer) in commercial bottle making equipment, haziness resulted.

This could be attributable to the different formulation used or the operating conditions of the extrusion-blow molding equipment. It is possible that additional shear or a change in formulation could optimize the conditions needed for non-hazy bottles in the particular equipment used.

In any event, compositions of the invention are outstandingly useful in those many areas where nontransparent rigid compounds are produced.

Example 4

In this example the yellowness index of the various samples was determined. Yellowness index (YI) of a plastic material is defined as $$\frac{100\ (1.28\ Y_{CIE} - 1.06\ Z_{CIE})}{Y_{CIE}}$$

where X, Y and Z are tristimulus values as determined in a colorimeter-spectrophotometer according to ASTM D–1925–63T.

The desired ideal value of yellowness index (YI) is zero. Negative values mean that the violet color from the toner still overweighs the yellow color due to thermal degradation, which is important since most customers prefer a faint blue-violet tint in the bottles. Therefore the less toner that must be used to overcome the yellow in order to produce the faint blue-violet tint, the more economical the formulation.

The index is measured in terms of the amount of milling time it would take to exceed the zero yellowness index. Generally a YI of 3 or 4 represents the upper limit for marketable products.

The results are summarized below in Table V.

TABLE V

| | Additive in formulation, percent | Mill time to exceed zero yellowness index (min.) |
|---|---|---|
| Composition: | | |
| I | Nil | 4 |
| II | Polypropylene (2.5) | 5 |
| III | PPAA (2.5) | 7 |
| IV | PPAA (5.0) | 10 |

As can be seen from the above Table V, the addition of the grafted polypropylene tends to lengthen the time considerably in which the PVC formulation can be milled at high temperatures without exceeding the zero yellowness index.

Example 5

Additional mill stability tests were carried out with the grafted polypropylene blended with PVC. In these additional tests the time to total inoperability was measured as evidenced by the sticking to the mill rolls and/or massive discoloration. Both of these phenomena are due to the thermal degradation of the polymer which is a most important characteristic. Data obtained in extended mill tests conducted at 375° F. are summarized as follows in Table VI.

TABLE VI

| | Parts of PVC replaced by additive | Mill life, minutes |
|---|---|---|
| Composition: | | |
| I | Nil | 30 |
| II | Polypropylene (2.5) | 35 |
| III | PPAA (2.5) | 50 |
| IV | PPAA (5) | 75 |
| V | PPAA (10) | 90 |

As can be seen by the results from the above Table VI, the use of the grafted polypropylene considerably extends the mill life, not only as measured by PVC containing no additive, but also as measured by comparison with PVC, containing just ungrafted polypropylene.

Example 6

The glass transition temperatures of PVC formulations containing grafted polypropylene as compared to PVC formulations containing no graft polymer were determined. The glass transition temperature (as represented by the abbreviation Tg) was determined in this example in a thermo-mechanical analyzer (TMA) by blending powdered grafted polypropylene with PVC and annealing at a temperature of 150° C.

That temperature is above the Tg of the resin and the melting point of most additives, which allows diffusion into the resin matrix. If the temperature exceeded 150° C. excessive PVC degradation would occur.

A 10 milligram sample was scanned in a nitrogen atmosphere, then cooled and reheated at a programmed rate of 10° C. per minute.

The inflexion point in the glass transition curve indicated the change in Tg due to the polymer-additive interaction.

Since PPAA has a softening point of at least 250° C. which is above the decomposition of PVC, it was necessary to compound the resin with a stabilizer and a lubricant before evaluation.

Thus a cylindrical test sample was subjected to a constant load at a temperature increasing at a constant rate of 10° C. per minute. The results are summarized below in Table VII.

TABLE VII.—EFFECT OF PPAA ON SOFTENING TEMPERATURE OF A RIGID PVC COMPOUND

By thermomechanical analysis (TMA)

Atmosphere—helium at 50 cc./min.
Heating rate—10° C./min.
Load—200 g.

| Composition | VI | VII | VIII |
|---|---|---|---|
| Formulation, parts by wt.: | | | |
| PVC resin | 100 | 95 | 90 |
| PPAA (¹) | | 5 | 10 |
| Stabilizer (¹) | 3 | 3 | 3 |
| Lubricant ² | 1 | 1 | 1 |
| Glass transition temperature, ° C | 71 | 74 | 72 |

¹ Thio-organotin, Mark X, Argus Chemical Corp.
² Stearic acid.

As can be seen from the above table, compositions VII and VIII which contain respectively 5 and 10 weight percent of PPAA have glass transition temperatures higher than that of the control formulation where 10 weight percent PPAA is used, and considerably higher where 5 weight percent of PPAA is used. This is quite surprising since generally conventional additives lower the Tg and the PPAA not only prevents a lowering but even increases it somewhat.

This is a significant advantage with products made from rigid PVC since the Tg corresponds very closely to the heat deflection temperature of the plastic compound. This heat deflection temperature property is measured by means of ASTM D–648–61 and for most rigid applications has a minimum specification of 66° C. at 264 p.s.i. load.

Thus PPAA is an unusual additive in that it imparts internal and external lubricity (see Example 7) without lowering the Tg. This is an unusual and desirable combination of properties.

Example 7

The lubricating properties of the PVC blends containing grafted polypropylene were further evaluated in a Brabender Plastograph. This is a conventional piece of equipment which is widely used to indicate lubricating properties by measuring *fusion time* and *preflexed torque*.

The formulation must contain a stabilizer, a processing aid and a lubricant in order to get measurable test results. As a general principle, external lubricants (waxes) generally delay fusion time and reduce torque. Internal lubricants (esters, alcohols) generally have the opposite effect.

The lubricants were used in this example at a 1.5 phr. concentration. The results are summarized below in Table VIII.

TABLE VIII.—BRABENDER FUSION TEST

| Formulation: | Parts |
|---|---|
| PVC resin | 100 |
| Thio-organotin stabilizer [1] | 2 |
| Phosphate chelator [2] | 1.5 |
| Polymethyl methacrylate processing aid [3] | 3 |
| Lubricant | 1.5 |

[Charge wt., 26 g.; head temperature 350° F.; speed 35 r.p.m.]

| Lubricant | Fusion torque, meter-grams | Time to fusion, sec. | Melt temp., °F |
|---|---|---|---|
| Microcrystalline wax | 3,150 | 165 | 424 |
| Linear polyethylene, MW 1,500-2,000 | 3,100 | 165 | 425 |
| Polypropylene | 3,400 | 50 | 438 |
| Polypropylene, 6% acrylic acid copolymer (PPAA) | 3,200 | 90 | 442 |

[1] Mark 1107, Argus Chemical Corp.
[2] Di-isooctyl phenyl phosphite.
[3] K-120N, Rohm and Haas Inc., Philadelphia.

As can be seen from the above table, polypropylene and PPAA show relatively short fusion times, high melt temperatures and high fusion torques. This would indicate that they possess internal lubricating properties, in addition to external lubricating properties. This is of significance in processing rigid PVC since it would reduce the requirement for the internal lubricants normally added. Usually for rigid PVC both types of lubricants are used. In this manner the PPAA would act in a dual function and thus reduce the requirement of additional lubricant.

Example 8

PVC formulations containing various external commercial lubricants, i.e. microcrystalline wax and linear polyethylene, were compared to formulations containing internal lubricants polypropylene and PPAA. The samples of these formulations were milled and pressed into plaques which were subsequently converted into pellets which were charged to an Instron capillary rheometer. The melt viscosities of extrusion compounds were determined at shear rates of 100 sec.$^{-1}$ and 250 sec.$^{-1}$. These two shear rates correspond to typical commercial extrusion and extrusion-blow molding shear rates, respectively. The resulting data are summarized below in Table IX at additive levels of 0.5, 1.0 and 1.5 phr. In these general viscosity ranges, the lower viscosities are advantageous for processing, but not so low as to cause inadequate mixing in the extruder.

TABLE IX

Melt viscosity of PVC compounds with various lubricants (lb.-sec./in.$^2$) at 100 sec.$^{-1}$ shear rate in Instron rheometer at 204° C. (400° F.)

[Formulation of Table VIII]

| | Parts/100 parts PVC | | | | | |
|---|---|---|---|---|---|---|
| | 0.5 | | 1.0 | | 1.5 | |
| Shear rate, sec.$^{-1}$ | 100[1] | | 100[1] | 250[2] | 100[1] | 250 |
| Microcrystalline wax | 0.035 | 0.024 | 0.033 | 0.020 | 0.034 | 0.019 |
| Linear polyethylene | 0.035 | 0.024 | 0.034 | 0.020 | 0.032 | 0.017 |
| Polypropylene | 0.036 | 0.022 | 0.035 | 0.022 | 0.033 | 0.022 |
| PPAA | 0.034 | 0.020 | 0.033 | 0.021 | 0.032 | 0.020 |

[1] Typical value for extrusion.
[2] Typical value for extrusion-blow molding.

As can be seen from the above Table IX, at 100 reciprocal seconds and at 0.5 and 1.0 additive levels there is very little difference between the melt viscosities of the various formulations. Thus these would all affect the melt flow properties in commercial extrusion equipment in the same manner. At the 1.5 level, at 100 reciprocal seconds there is apparently an advantage for the acrylic acid graft and the linear polyethylene over the microcrystalline wax.

At the extrusion-blow molding shear rates, i.e. the 250 reciprocal second levels, there are differences in behavior observed with different additive contents.

Thus the grafted polypropylene gives significantly lower viscosity levels at 0.5 phr. concentrations than the other additive formulations. Even polypropylene is better than the conventional lubricants. At the relatively high 1.5 phr. level the grafted polypropylene viscosity is approximately the same as the wax and relatively high compared to the polyethylene. But the polypropylene without grafting has the highest viscosity of all.

Example 9

As a general proposition lubricants are known to have limited or poor compatibility with PVC. Also, as a rule of thumb, external lubricants are much less compatible with PVC than internal types. The degree of compatibility of a lubricant can be measured by studying the clarity of an extrudate from a capillary viscometer.

For most PVC systems there is a critical (minimum) shear rate for optimum clarity. This must be reconciled with the characteristic shear rate discussed above in Example 8 which is related to the particular processing operation, that is, the 100 reciprocal seconds for commercial extrusion and the 250 reciprocal seconds for extrusion-blow molding. Since these shear rates are minimum shear rates, if clarity or roughness develops below the critical shear rates then the compatibility of the lubricant with the PVC is shown to be unsatisfactory.

The critical shear rate for clarity in reciprocal seconds is usually expressed as $\delta_c$ and the shear rate for the smoothness of the extrudate is usually expressed as $\delta_s$. The smoothness of the extrudate is a measure of the lack of roughness and irregularity of the extrudate and is an index of lubricating ability. The results obtained from the Instron rheometer are summarized below in Table X.

TABLE X.—COMPATIBILITY OF LUBRICANTS WITH PVC
Instron rheometer at 204° C. (400° F.)

[Formulation of Table VIII]

| | Parts/100 parts PVC | | | | | |
|---|---|---|---|---|---|---|
| | 0.5 | | 1.0 | | 1.5 | |
| $\delta_c$=Critical shear rate for clarity of extrudate, sec.$^{-1}$ $\delta_s$=Critical shear rate for smoothness of extrudate, sec.$^{-1}$ | $\delta_c$ | $\delta_s$ | $\delta_c$ | $\delta_s$ | $\delta_c$ | $\delta_s$ |
| Microcrystalline wax | 750+ | 750+ | 3 | 750+ | 3 | 15 |
| Linear polyethylene | 750+ | 3 | 30 | 300 | 3 | 150 |
| Polypropylene | 750 | 750 | 3 | 750 | 3 | 300 |
| Polypropylene, 6% acrylic acid | 750+ | 750+ | 750+ | 750+ | 300 | 750 |

NOTE.—At shear rates below $\delta_c$ clarity is acceptable; at shear rates below $\delta_s$ smoothness is acceptable.

As can be seen from the above table at the 0.5 phr. level, satisfactory clarity was obtained with all the lubricants and only linear polyethylene gave a rough extrudate.

At the 1 phr. level, everything but the PPAA reduced clarity at low rates of shear. At 1.5 phr. this lack of clarity was also observed for the polyethylene.

Also at 1.5 phr., neither the polyethylene nor the wax showed satisfactory smoothness of extrudate properties.

The white oils referred to herein (Table III) are prepared from petroleum distillates, which are essentially a paraffinic-naphthenic feed stock, by treatment with fuming sulfuric acid. The acid removes substantially all unsaturated and aromatic components as sulfonates. Subsequent treatment of the raffinate comprises neutralization, steaming and clay percolation whereby other components deleterious to clear polyvinyl chloride compounds are removed. These oils should have a minimum color on the Saybolt scale of +30, a flash point (Cleveland Open Cup) of at least 300° F., and a viscosity at 100° F. of about 45 to 500 S.U.S. The preferred white oils are those in the low viscosity range of 50 to about 100 S.U.S. at 100° F., e.g. Marcol 52 and Marcol 70 marketed by Humble Oil & Refining Company. Higher viscosity white oils tend to reduce the clarity of transparent PVC somewhat.

The microcrystalline petroleum waxes used herein are prepared from the first cut of paraffin SAE 10-40 grade feedstocks and are refined by a hydrofinishing method. The composition of these waxes may vary slightly but preferably should contain a minimum of 99% straight chain paraffins. These waxes have a molecular weight in the range of about 400 to about 500, a color on the Saybolt scale of +30 minimum, a melting point in the range of 140°–165° F., a maximum oil content of 0.5%, and a viscosity at 210° F. of 35 to 50 S.U.S. For good general discussions of microcrystalline waxes and white oils, including methods of preparation, see "Microcrystalline Waxes," pages 181–188 and "Petroleum White Oils and Sulfonic Acids," pages 189–193, both in *The Science of Petroleum*, Vol. V, Part III, Oxford University Press (1955), each of which is incorporated herein by reference.

It should also be noted that the graft copolymer can be added (in a solvent) during polymerization of vinyl chloride.

What is claimed is:

1. A polyvinyl plastic composition which comprises:
   (a) polyvinyl resin selected from the group consisting of polyvinyl chloride, chlorinated polyvinyl chloride, polyvinyl acetate, polyvinyl alcohol, and polyvinyl butyral having a weight average molecular weight of about 40,000 to about 90,000 and containing a minor amount of $C_3$ to $C_{10}$ unsaturated mono or polycarboxylic acid or glycidyl acrylate grafted to a $C_2$ to $C_8$ monoolefin polymer having a melt index or melt flow rate of from about 1 to 1,000 sufficient to lubricate said polyvinyl resin.

2. A composition according to claim 1 wherein said polyvinyl resin is a rigid polyvinyl chloride resin.

3. A composition according to claim 1 wherein said polyolefin contains predominantly either a $C_2$ or a $C_3$ component.

4. A composition according to claim 1 wherein said carboxylic acid is acrylic acid.

5. A composition according to claim 1 wherein said resin is polyvinyl chloride, said polyolefin is derived from a $C_2$ or $C_3$ mono-alpha-olefin and said carboxylic acid is acrylic acid.

6. A polyvinyl chloride composition comprising a major proportion of a polyvinyl chloride resin and a minor proportion of a grafted $C_2$ to $C_3$ polyolefin having a melt flow rate of from 10 to 100 and being grafted with from about 0.1 to 20 weight percent of acrylic acid.

7. A composition according to claim 6 wherein said grafted polyolefin is present in the composition in about 0.05 to 20 weight percent proportions.

8. A composition according to claim 5 wherein said melt-flow rate is about 10 to 250.

References Cited
UNITED STATES PATENTS

| | | | |
|---|---|---|---|
| 3,299,176 | 1/1967 | Longworth | 260—876 R |
| 3,211,808 | 10/1965 | Young | 260—876 R |
| 3,177,270 | 4/1965 | Jones | 260—876 R |
| 3,177,269 | 4/1965 | Nowak | 260—876 R |

MORTON FOELAK, Primary Examiner

U.S. Cl. X.R.

260—836, 878, 882, 884, 885